Nov. 30, 1965    C. R. CANTONWINE    3,221,232
ELECTRIC MOTOR CONSTRUCTION HAVING VARIOUS DISTRIBUTION
FACTORS AND PARTIAL WINDING STARTING
Filed Jan. 29, 1962    2 Sheets-Sheet 1

INVENTOR
Charles R. Cantonwine

INVENTOR
Charles R. Cantonwine

United States Patent Office 3,221,232
Patented Nov. 30, 1965

3,221,232
ELECTRIC MOTOR CONSTRUCTION HAVING VARIOUS DISTRIBUTION FACTORS AND PARTIAL WINDING STARTING
Charles R. Cantonwine, 950 Airport Road, Hot Springs, Ark.
Filed Jan. 29, 1962, Ser. No. 169,409
20 Claims. (Cl. 318—224)

This invention relates to motors in general and more particularly to improved means for starting and running alternating current (hereinafter abbreviated A.C.) motors which enable such motors to have increased running torque and to operate more efficiently.

In the past, it has been the practice to provide A.C. motors with separate starting and running windings. Once these motors reached a predetermined speed, the starting winding was disconnected from the circuit or otherwise made ineffective and became deadweight at running speeds. Also it has been the practice to use all of the windings during starting and only part of the windings during running.

In my co-pending patent application Serial No. 661,634 filed May 27, 1957, now Patent No. 3,031,606, there is described a self starting motor using all or part of the winding during starting condition and all of the windings during the running condition.

Also in my co-pending patent application Serial No. 765,238 filed October 3, 1958, now Patent No. 3,068,389, there is described a self starting motor that uses all or part of the windings during the starting condition and all of the windings during the running condition, and a phase shifting means dependent upon transformer action and leakage reactance.

The present invention overcomes this objectionable feature of known motor construction by providing a relatively simple motor construction which uses all of the windings in the motor for running and only a part of the windings for starting the motor, thereby increasing the power output and efficiency of the motor.

It is therefore a principal object of this invention to provide a single speed A.C. motor that employs all of its windings for running.

Another object is to provide a partial winding start, full winding run motor which is relatively simple and inexpensive to construct.

Another object is to substantially increase the power output and efficiency of A.C. motors by means that can be installed as original equipment or added as an improvement on existing motors.

Another object is to eliminate the need for a separate starting winding on A.C. motors.

Another object is to increase the output for a given size motor frame.

Another object is to enable one motor frame to be used for single phase and polyphase motors of the same rating.

Another object is to permit the use of cheaper and lighter weight materials without down rating the frame size.

Another object is to provide an A.C. motor that has relatively higher starting than running impedance.

Still another object is to provide an A.C. motor which can switch from start to run condition at speeds greater than, equal to, or less than the running speed using the simplest of switches.

These and other objects and advantages of the present invention will become apparent after considering the following detailed specifications in conjunction with the accompanying drawings.

In the drawings:

FIG. 1 as a schematic drawing showing a motor embodying the present invention.

Figure 1:
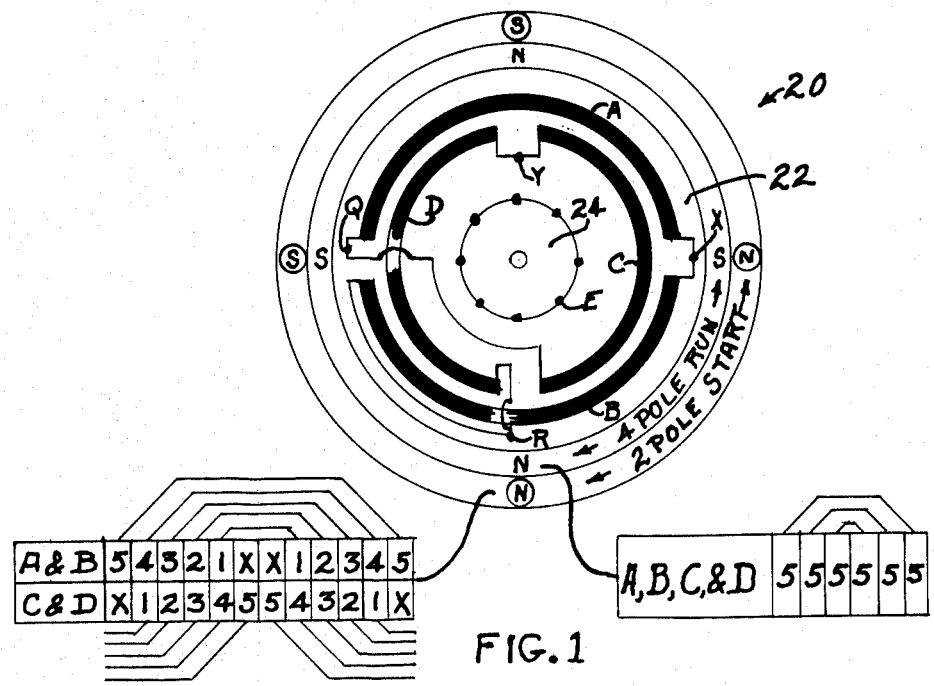

Referring to the drawings by reference numbers, the number 20 in FIG. 1 refers to a motor which has a stator 22 and a rotor 24. The stator 22 has four symmetrically positioned windings designated A, B, C, and D, and a rotor 24 has a winding designated E.

The stator windings A and B are opposite each other on the stator 22 (FIG. 1). Windings C and D are also opposite each other and are offset 90 electrical degrees from the windings A and B. Each of the windings A, B, C, and D are herein defined as a pole winding group for a two pole motor, however, for other number of poles each of the windings A, B, C, and D can consist of two or more pole winding groups.

Winding A is connected to winding B at X, winding B is connected to winding D at R, winding D is connected to winding C at Y and winding C is connected to winding A at Q. Therefore, the windings A, B, C, and D are electrically connected together permanently in series to form a closed loop circuit as shown in FIGS. 1, 3, 4, and 5.

Figure 2:
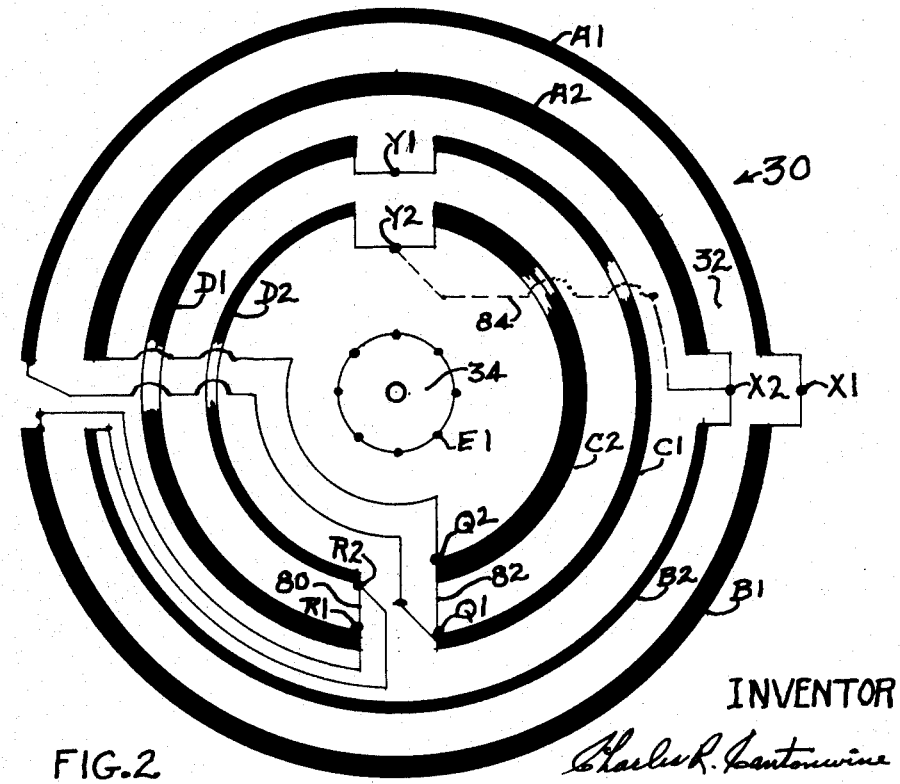
FIG. 2 is a modified schematic drawing of the motor shown in FIG. 1 and embodying the present invention.

FIG. 2, the number 30 in FIG. 2 refers to a motor which has a stator 32 and a rotor 34. The stator 32 has four pairs, or two sets of four, symmetrically positioned windings designated A1, A2, as one pair, B1 and B2 as a second pair, C1, and C2 as a third pair, and D1 and D2 as a fourth pair, one set of four windings consist of A1, B1, C1, and D1, and the other of two sets of four windings consist of A2, B2, C2, and D2, and the rotor 34 has a winding designated E1.

The stator windings pair A1–A2, and pair B1–B2 are opposite each other on the stator 32 (FIG. 2) and are illustrated as being physically located further out from the rotor 34 than windings pair C1–C2, and pair D1–D2, but this is not necessarily limited and the relationship can be reversed. Windings pair C1–C2, and pair D1–D2 are also opposite each other and are offset 90 electrical degrees from the windings pair A1–A2, and pair B1–B2. Each of the pairs A1–A2, B1–B2, C1–B2, and D1–D2 comprise one pole winding group for a tow pole motor, however, for other numbers of poles each pair can comprise two or more pole winding groups. Each pair forming a pole winding group in any one of several combinations such as, concentric, overlap, in the same slots, in separate slots, or any other known method.

Figure 6:
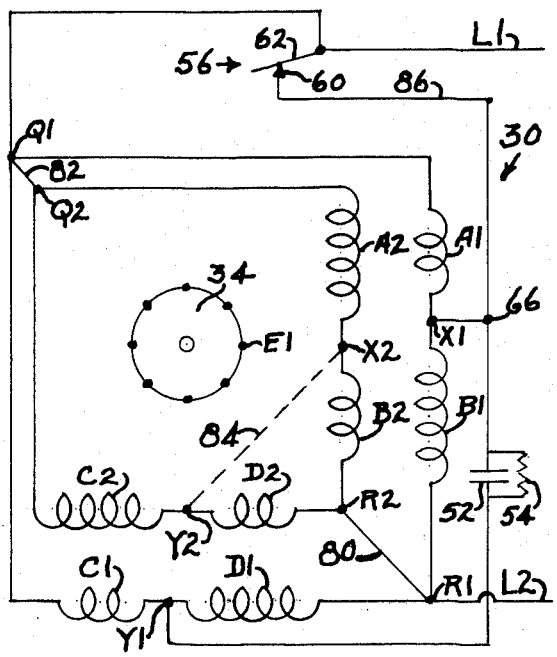
FIG. 6 is a schematic wiring diagram of the electrical circuit for the motor shown in FIG. 2, the circuit is shown in the starting condition.

Winding A1 is connected to winding B1 at X1, winding B1 is connected to winding D1 at R1, winding D1 is connected to winding C1 at Y1 and winding C1 is connected to winding A1 at Q1. Likewise winding A2 is connected to winding B2 at X2, winding B2 is connected to winding D2 at R2, winding D2 is connected to winding C2 at Y2 and winding C2 is connected to winding A2 at Q2. Junction Q1 is connected by jumper 82 to junction Q2, Junction R1 is connected by jumper 80 to junction R2, Junction X2 is connected by optional jumper 84 to junction Y2. Therefore the windings A1, B1, C1, and D1 are permanently connected together in series to form a first closed loop circuit as shown in FIG. 2 and 6, and likewise the windings A2, B2, C2, and D2 are permanently connected together in series to form a second closed loop circuit as shown in FIGS. 2 and 6. The first closed loop circuit will therefore have four junctions, Q1, R1, X1, and Y1, positioned between the windings, and the second closed loop circuit will have four junctions, Q2, R2, X2, and Y2, positioned between the windings. The first and second closed loop circuits to be permanently connected together by jumper 80 at R1 and R2, and permanently connected together by jumper 82 at Q1 and Q2. Jumper 84 shown in dotted lines can optionally be connected between junctions X2 and Y2, the purpose of which will be explained hereinafter.

In FIGS. 1 and 2 the coil span of each pole winding group is shown as having less than 180 degrees span, however, it is not limited to this arrangement, and the coil span can be any angle from, less than 90 degrees to over 180 degrees.

The motor 20 of FIG. 1 and motor 30 of FIG. 2 are very similar except that motor 30 has two separate sections comprising each pole winding group, therefore the references shown in FIG. 1 can apply equally to FIG. 2, such as the polarities during, starting and running, and also the winding distribution charts. It is intended that any ideas disclosed in one of the drawings can, where applicable, be applied interchangeably to the other drawings. For example switch 44 of FIG. 3 can be applied to FIG. 5 and 6 if desired, and reactor 58 of FIG. 5 can be applied to FIGS. 3, 4, and 6.

The suggested 24 slot winding distribution chart labeled "2 pole start" of FIG. 1 is to the lower left of the motor 20 schematic lay-out, and the resulting, or consequent, distribution chart labeled "4 pole run" is to the lower right of the motor 20 schematic lay-out. The two pole start distribution chart shows a favorable two pole winding distribution to provide approximately the same, or lower, flux density under the two pole starting condition as is realized under the four pole running condition. Usually the flux density ratio is about 1.414 to 1 when regrouping the windings, having the same winding distribution or the same number of conductors per coil, from a two pole to a four pole connection, (or stated inversely, the flux density ratio is 1 to the, square root of 2, when regrouping from a four pole connection to a two pole connection, if the winding distribution is unchanged or has the same number of conductors per coil and the same number of coils). However, the objects of this invention can best be obtained when this ratio is less than 1.40 to 1 and preferrably closer to a 1 to 1 ratio, or even lower, as will be described more fully hereinafter. The two distribution charts shown in FIG. 1 show a different distribution factor, being higher for the two pole starting connection, than for the four pole running connection. The letters A, B, C and D refer to the corresponding windings of motor 20 as well as winding pairs A1–A2, B1–B2, C1–C2, and D1–D2 of motor 30 of FIG. 2. The numbers 1–5 represents the number of turns multipled by a constant factor, such as 10.

It should be noted that all slots are completely filled with the same number of conductors to provide maximum input capacity, and output of the motor under running conditions. Under running conditions of motor 20 FIG. 1, windings A and B, in series, carry one-half of the load and windings C and D, in series, carry the other half of the load, assuming the windings are the same, otherwise each would carry its proportion of the load input. Likewise under running conditions of motor 30 in FIG. 2, windings A1 and B1, in series, carry one-fourth of the load, windings A2 and B2, in series, carry one-fourth of the load, windings C1 and D1, in series, carry one-fourth of the load, and windings C2 and D2, in series, carry one-fourth of the load, assuming the windings are the same, otherwise each would carry its proportional share of the load input. Therefore it is possible to obtain approximately 150% to 200% of the normal output from a given frame size and thereby make it possible to construct single phase and polyphase motors, of the same horse power, to be interchangeable. If desired, aluminum wire, instead of copper wire, can be used without down rating the frame size.

Figure 3:
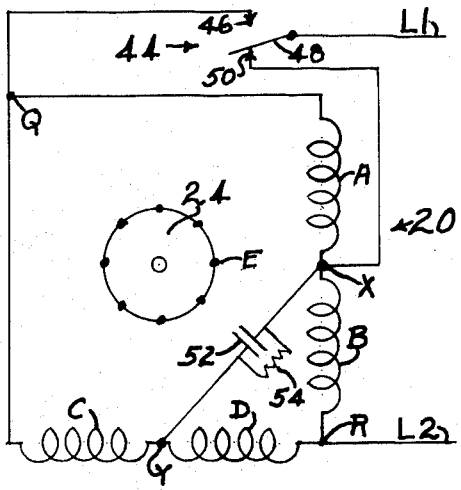
FIG. 3 is a schematic wiring diagram of the electrical circuit for one form of the motor shown in FIG. 1, the circuit being shown in the starting condition.

FIG. 3 shows one form of the circuit for the motor 30 of FIG. 1. In this circuit a capacitor 52 shunted by resistor 54 is connected between points X and Y, a lead L2 is connected to R, and a switching device 44 having a switch blade 48, a normally open contact 46 and a normally closed contact 50 connected between Q and X. The switch blade 48 is connected to the lead L1 and, as the circuit is shown, with the switch blade 48 engaging contact 50, it is in the starting position. In the starting condition windings B, comprising one-half of the main winding pole groups, and winding D comprising one-half of the starting winding pole groups, are primarily energized, and the phase shift is provided by the parallel combination of the capacitor 52 and the resistor 54 in series with winding D and across winding B. Although the other half of the main winding, A, and the other half of the starting winding, winding C, are connected in the circuit the windings A and C are relatively ineffective as they are in the magnetic shadow of the relatively low impedance winding E of rotor 24, and also because the relative position and relative polarities of the connections contribute to provide windings A and C with a relatively high impedance under starting conditions.

To better understand how starting torque is developed consider that windings A and C are disconnected or do not exist during starting. Then one-half of the main winding represented as winding B acts as the main winding and one-half of the starting winding represented as winding D acts as the starting winding, with the capacitor 52 shunted by resistor 54 in series therewith causing a phase shift to produce starting torque. The polarities shown in FIG. 1 designated "2 pole start" will have a strong N pole at 6 o'clock position generated by main winding portion B, and a weaker S pole in the 12 o'clock position generated by winding B, likewise there will be a strong S pole generated at a 9 o'clock position by starting winding portion D in space and magnetic quadrature to main winding portion B and a weaker N pole at a 3 o'clock position generated by starting winding portion D. Therefore there will be a substantial current flowing from lead L1 through switch blade 48, contact 50 to X and through winding B to R and to lead L2, there will also be a substantial out of phase current flowing from X through capacitor 52 shunted by resistor 54 to Y through winding D to R and to lead L2, but there will be relatively little current flowing through windings A and C, either by conduction or induction. Ordinarily this will create an uneven pull on the rotor 24 during starting causing some noise and vibration. This condition, when objectionable, can be overcome in other forms and modifications of this invention particularly motor 20 of FIGS. 1 and 5, also motor 30 of FIGS. 2 and 6 of this invention which will be described more fully hereinafter.

In the running position of switch 44 of FIG. 3, with the switch blade 48 engaging contact 46, the series connected main winding A and B are connected in parallel with the series connected starting windings C and D forming a series-parallel arrangement across an A.C. source, utilizing all of the windings in the running connection. The phase shifting impedance device capacitor 52 shunted by resistor 54 will then be connected in a circuit between, an intermediate point X of the main winding A and B, and at an intermediate point Y of the starting winding, C and D.

Although windings A and C have been referred to as a portion of the main and starting winding respectively, they do not effective function as such but are relatively positioned only as such during starting.

Figure 4:
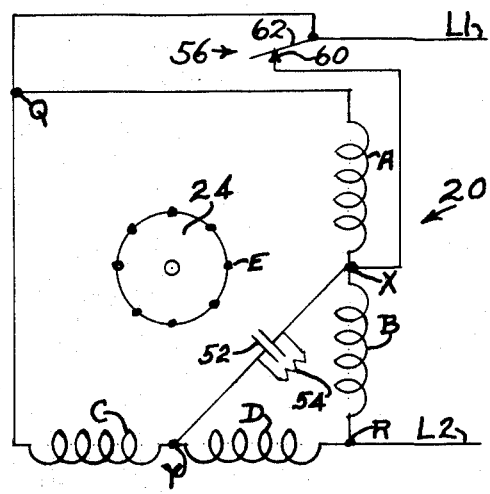
FIG. 4 is a schematic wiring diagram of the electrical circuit for one form of the motor shown in FIG. 1 and is simplified over the diagram shown in FIG. 3, the circuit is shown in the starting condition.

FIG. 4 shows a modified form of the circuit for the motor 20 in FIG. 1. This circuit is a simplified form of FIG. 3 and uses only one switch blade 62 and one stationary contact 60 located on switching device 56, short circuiting main winding portion A during the starting connection only.

In the circuit of FIG. 4 a capacitor 52 shunted by resistor 54 is connected between points X and Y, a lead L2 is connected to R, and a switching device 56 having a normally closed contact 60 and a switch blade 62 is connected between X and Q. The switch blade 62 is connected to the lead L1 and, as the circuit is shown, with the switch blade 62 engaging contact 60 it is in the starting condition. In the starting condition, winding B comprising one-half of the main winding pole groups and winding D comprising one-half of the starting winding pole groups, are primarily energized, and the phase shifting is provided by the parallel combination of the capacitor 52 and resistor 54 connected in series with winding D and across winding B. Although the other half of the main winding, winding A, is short circuited and the other half of the starting winding, winding C, are connected in the circuit, windings A and C are relatively ineffective by reason of the same explanation of FIG. 3. Whether winding A is short circuited as in FIG 4 or left open as in FIG. 3, very little, if any, difference can be detected in the starting torque or the starting current. The running connections of FIG. 4 are identical to those shown and described for FIG. 3, however, there is no interruption of current to the motor in FIG. 4 when switching device 56 transfers from a starting to a running connection, whereas there is an interruption in the motor current in FIG. 3 unless it is desired to arrange switch device 44 so that switch blade 48 engages contact 46 before it disengages contact 50 in which case there would be no interruption of current in FIG. 3. The switch 44 of FIG. 3 does however have the advantage that it can be adapted to have an "off" position, to render the motor inoperative, with switch blade 48 at a position intermediate to and disengaged from contacts 46 and 50 the line current in lead L1 is interrupted.

Figure 5:
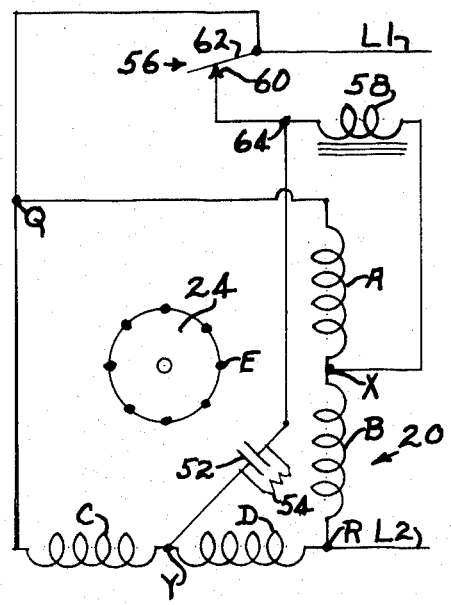
FIG. 5 is a schematic wiring diagram of the electrical circuit for another form of the motor shown in FIG. 1 and has a simplified switching means over the diagram of FIG. 3, using a reactor element, the circuit is shown in the starting condition.

FIG. 5 shows another modified form of motor 20 of FIG. 1. This circuit is substantially the same as in FIG 4 except that a reactor element 58 is included as an additional phase shifting means to increase the starting impedance and contribute to the phase shift and starting torque, and also to reduce the noise and vibration associated with starting conditions. In the circuit of FIG. 5 a lead L1 is connected to switch blade 62 of switching device 56, switch blade 62 engages with normally closed contact 60 which is connected to junction 64, to one end of reactor 58, the other end of reactor 58 is connected to one end of winding B at X, the other end of winding B is connected to R and to lead L2, another circuit starting at junction 64 connected to one side of parallel connected capacitor 52 and resistor 54, the other side of which is connected to one end of winding D at Y, the other end of winding D is connected to R and to lead L2. These circuits provide the starting circuit and starting torque, however, there is a relatively ineffective and high impedance circuit starting at X through winding A to Q and through winding C to Y, Q is connected to lead L1, another circuit during starting is shunting winding A which is relatively ineffective except for the small voltage drop across reactor 58 which has very little effect on the circuit. This circuit begins at one end of winding A at X through reactor 58 junction 64, stationary contact 60 switch blade 62 to Q and the other end of winding A. The means of developing starting torque is substantially as explained in the description of FIG. 3.

The running connection of FIG. 5 is the same as explained in FIGS. 3 and 4 except that the phase shifting impedance devices consisting of reactor 58 and parallel combination of capacitor 52 and resistor 54 being serially connected to an intermediate point on each of the main and starting winding portions at X and Y respectively.

FIG. 6 shows the circuit for motor 30 in FIG. 2. This circuit is similar to motor 20 FIG. 1 except that each of the windings A, B, C, and D of FIGS. 1, 3, 4, and 5 are wound in two sections as shown in FIGS. 2 and 6 and described heretofore. FIG. 2 shows all of the connections of the two permanently connected closed loop circuits, and FIG. 6 shows the electrical connections of the closed loop circuit junctions to the A.C. source, and to the phase shifting impedance device, through winding junctions Q1, R1, X1, and Y1. Switching device 56 is shown in the starting position. The lead L1 is connected to speed responsive switching device 56, switch blade 62 which engages normally closed contact 60 connected by lead 86 to junction 66, to winding B1 at X, the other end of winding B1 is connected to R1 and lead L2, another circuit beginning at lead L1 through the switch to junction 66 to one side of parallel connected capacitor 52 and resistor 54 the other side of which is connected to winding D1 at Y1, the other end of winding D1 is connected to R1 and lead L2, the lead L1 is also connected permanently to Q1. This is the basic starting circuit with winding B1 acting as a partial main winding and winding D1 acting as a partial starting winding connected through a phase shifting impedance device capacitor 52 and shunting resistor 54 and across the line leads. There is, however, an additional starting torque developed that contributes to the starting torque developed by the said basic circuit. Each winding of each pair are located on stator 32 FIGS. 2 and 6 in position to be mutually inductively coupled to each other. Winding A1 is coupled to A2, B1 to B2, C1 to C2, and D1 to D2. Therefore in the starting condition of the said basic starting circuit, main winding B1 is primarily energized across the A.C. source. Since winding B1 is mutually inductively coupled to winding B2 a voltage will be induced in winding B2 by transformer action. If jump 84 is connected between X2 and Y2, the voltage induced across winding B2 will be impressed across starting winding D2 through the common junction R2 and jumper 84. The phase of the current in winding D2 is out of phase with the current in main winding B1 by virtue of the transformer action and associated leakage reactance between the primary winding B1 and the secondary winding B2. It is well known that transformer leakage reactance causes an inherent phase shift so it is not deemed necessary to further describe this action, except to state that it has never been known to have been used in motor construction. Thus there is provided an additional phase shifting means, not heretofore known to be used in electric motor construction, by using optional jumper 84. Jumper 84 can be replaced by a condenser, as distinguished from capacitor hereinafter, or by a shunted capacitor adding another phase shifting means. The windings A1, A2, C1, and C2, and even B2 and D2 when optional jumper 84 is not employed, are relatively ineffective during the starting condition. Winding A1 is short circuited during the starting connection through the circuit from one end of winding A1, at X1 to junction 66 contact 60, switch blade 62 through Q1 back to the other end of winding A1. The short circuiting of winding A1 has little or no effect on the starting torque or current, but it does simplify the switching operation. The basic starting circuit of motor 30 FIGS. 2 and 6 are essentially the same as motor 20 FIGS. 1, 3, 4 and 5 and the explanation of FIG. 3 applies equally to FIGS 2 and 6.

The primary advantage of motor 30 FIGS. 2 and 6 over the motor 20 of FIGS 1, 3, 4, and 5 is that the starting connection provides a higher input impedance, higher starting torque and a quieter start, and as in motor 20 utilizes all of the windings to provide a full composite running winding. This is accomplished as shown in FIGS. 2 and 6 by providing the main winding B1 with greater number of turns than main winding A1 and providing starting winding D1 with greater number of turns than starting winding C1. To provide a balanced running condition and provide each pole winding group with the same number of turns, the main winding A2 can have the same number of turns as main winding B1, and main winding B2 can have the same number of turns as main winding A1, likewise starting windings D1 equals C2, and D2 equals C1.

In the running position of switch device 56 FIG. 6 the switch blade 62 disengages contact 60 leaving four series-parallel circuits across the A.C. source. A first circuit comprising the series connected main windings A1 and B1, a second circuit comprising the series connected main windings A2 and B2, a third circuit comprising the series connected starting winding C1 and D1, and a fourth circuit comprising the series connected starting winding C2 and D2. One phase shifting means comprising capacitor 52 shunted by resistor 54 remains connected, during running, between X1 located at an intermediate point on a first main winding A1, B1, and to Y1 located at an intermediate point on a first starting winding C1, D1, and another phase shifting means as provided by optional jumper 84 remains connected, during running, between X2 located at an intermediate point on a second main winding A2, B2, and to Y2 located at an intermediate point on a second starting winding C2, D2. During the running condition points X1 and Y1 are preferrably at points of equi-potential, and also the points X2 and Y2 are preferably at points of equipotential. Therefore, during the running condition, all of the motor windings contribute to carry the full running load, and all phase shifting means are deactivated by means other than by switch means directly connected thereto.

Motors 20 and 30 of FIGS. 1–6 can properly be classified as partial winding start, full winding run, single phase A.C. motors.

The polarities indicated in FIG. 1 and labeled "2-pole start" and "4 pole run" are intended to apply also to FIG. 2 in the same relative pisitions. It is important to note that during starting of motors 20 and 30 the stator windings are connected having two poles positioned as shown in FIG. 1. Although only one pole winding group is primarily energized a two pile field is consequently obtained. During the running condition the stator windings are connected having four poles. Therefore motors 20 and 30 can be adapted to operate as to speed motors, starting at the lower number of poles.

Although a two pole start, four pole run motor is illustrated, it is not limited to this arrangement, as the motors 20 and 30 can start at any number of poles and run at twice the number of poles. This invention is considered a single speed motor in one form at least, starting only on the lower number of poles and transferring to the greater number if poles at approximately the speed croresponding to the running speed of the greater number of poles. Therefore, by properly selecting the operating speed for the switching devices 44 and 56 the motor can be made to transfer from the start to the run condition at a speed that is less than, equal to, or greater than the running speed. Usually, however, it is desirable to adjust the switching devices 44 and 56 to change-over at a speed slightly greater than running speed so that the motor drops into running speed rather than pulls into running speed. This eliminates or greatly reduces the shock and vibration which normally occurs during the switch-over.

It is important to note that the circuits of this invention as shown in FIGS. 1–6, under running conditions, will discriminate between the construction of the two general types of capacitors or condensers used for the starting capacitor 52 of FIGS. 3–6. The two general types of capacitors are herein defined as the dielectric type which can be of the oil, paper, mica or similar construction and the electrolytic type which is a device consisting of two series-opposed polarized cells. Although the words "capacitor" and "condenser" are often used synonymously today, at one time the dielectric type was known as a condenser, and when the electrolytic type was first extensively used commercially in the radio industry, it was distinguished from the condenser by the name "capacitor." In this application it is preferred to maintain this distinction and the element 52 will therefore be referred to as a capacitor when the electrolytic type of intermittent duty motor starting capacitor is preferred, although there is no objection to using a condenser for element 52 or in other parts of the circuit, as will be explained hereinafter. It is anticipated herein that any substitute for the electrolytic capacitor such as an intermittent duty motor starting capacitor of similar construction would be considered an equivalent. Although the dielectric type of continuous duty condenser is considered to be of different construction than the electrolytic capacitor.

In the circuit of motor 20 and 30, the starting capacitor 52 is theoretically at zero potential during the running connection. However, if the rotor air gap is non-uniform or the bearings are slightly worn, a normal commercial expectancy, there is the possibility of a charge accumulating on capacitor 52 in pulses or increments at about the slip frequency of the rotor. If the condenser is of the dielectric type, the charge will dissipate at the end of each pulse. However, if the capacitor is of the electrolytic type, then the charge holds in one half of the capacitor, in one cell, and additively builds up in steps to a high value causing an unbalance in the circuit resulting in very undesirable circulating currents in the motor windings. This phenomena, it is believed, is caused by the self-rectifying action and general nature of the electrolytic capacitor. There is a very distinct difference in the way these two types of capacitor or condensers accept a charge and discharge, due to the difference in construction. It is not considered that the two types are equivalents in the running condition of motors 20 and 30. It is therefore usually necessary to provide a relatively low resistance shunt across the electrolytic capacitor 52 in this circuit, at least during the running connection, either by switching means or by permanently connected shunt as shown in FIGS. 3–6 by the resistance 54. It is not necessary to provide this low resistance if a dielectric type of condenser is used, for example in the two speed operation. However, there is no objection to so doing because the low resistance would then serve as a winding-to-winding equalizer during the running condition. Furthermore, the resistance 54 need by only low enough to prevent a charge from accumulating on capacitor 52 during the running condition, said resistor 54 is not considered as a usual, capacitor residual charge, discharge resistor, as the capacitor initially discharges through the relatively lower impedance windings of the motor at the time the speed responsive switch operates to a running position. Resistor 54 is shown as a lumped ohmic resistor element, however, the same results can be obtained by having a predetermined low value of leakage resistance within the capacitor itself either by preselection or by capacitor design to serve the same purpose as resistor 54.

It is anticipated that when desired that the stator windings can be on the rotatable member and the rotor windings can be on the stationary member of the motor.

It is also anticipated that, if desired, capacitor 52 and resistor 54 can be eliminated entirely in FIG. 6 and jumper 84 employed to provide a separate and only phase shifting means to start motor 30.

The speed responsive switch devices 44 and 56 can be of the mechanical governor type actuating the movable switch blades 48 and 62 respectively, to be in a starting position as shown, at speeds below a predetermined speed and in a running position at speeds above a predetermined speed, or said switches can be of the relay type actuated by changes of motor speed as reflected in a change of current or voltage in any part of the motor circuit, or any suitable equivalent thereof, such as a manually operated device when preferred for two speed operation for example. Switch 44 used in FIGS. 3–6 provides a 2 speed and off swtch.

It is now apparent that there has been provided a novel motor construction which fulfills all of the objects and advantages sought therefor, furthermore, this invention is intended to cover all changes, alterations and modifications of the examples of the invention herein chosen for purposes of disclosure, which do not constitute departures from the spirit and scope of the invention, and all such changes, alterations and modifications which will be readily apparent to one skilled in the art are contemplated as being within the scope of the present invention which is limited only be the claims which follow.

What I claim is:

1. A partial winding start, full winding run, single phase A.C. motor comprising a stator having a stator winding thereon and a rotor having a rotor winding thereon, one of said windings having at least one set of four separate symetrically positioned winding portions, each of said four portions of said at least one set including at least one pole winding group, and all of said four portions of said at least one set to be permanently connected in series to form a separate closed loop circuit, for each of said at least one set, each having four junctions therebetween on each of said at least one set, speed responsive switch means movable between a starting position when the motor is operated below a predetermined speed and a running position when the motor exceeds said predetermined speed, said switch means comprising one switch blade and not more than two stationary contacts, means including the starting position of said switch means connecting an A.C. source of energy to selected ones of said junctions of one set of said closed loop circuits so that two of the said four winding portions are positioned in space quadrature to the other two of said four winding portions and connected so that one of the said two of the said four winding portions acts as a partial main winding and one of the said other two of said four winding portions acts as a partial starting winding, other sets of said closed loop circuit to be mutually inductively coupled to said one set of said closed loop circuit and in the same relative space quadrature, said other sets to be connected to said one set at selected junctions, at least one means of shifting the phase between the quadrature spaced windings of at least one set of closed loop circuits to be provided during the starting, means including the running position of said switch means connecting all of the said winding portions in a series parallel arrangement across the said A.C. source to provide a full running winding with said phase shifting means connected across selected one of said junctions so as to deactivate said means during the running condition of said motor.

2. The motor defined in claim 1 wherein the said speed responsive switch means comprising one switch blade and one stationary contact.

3. The motor defined in claim 1 wherein the said phase shifting means including an electrolytic capacitor element shunted by a relatively low resistance element.

4. The motor defined in claim 1 wherein the said phase shifting means include a continuous duty dielectric type of condenser elements as distinguished from an intermittent duty electrolytic type of motor starting capacitor element.

5. The motor defined in claim 1 wherein the said phase shifting means include a reactor element.

6. The motor defined in claim 1 wherein the said phase shifting means include leakage reactance means supplied by transformer action between the said windings.

7. A partial winding start, full winding run, single phase A.C. motor comprising a stator having a stator winding thereon and a rotor having a rotor winding thereon, one of said windings having four separate symmetrically positioned winding portions, each of said four winding portions including at least one pole winding group and all of said four portions permanently connected in series to form a closed loop circuit having four junctions positioned therebetween, speed responsive switch means movable between a starting position when the motor is operated below a predetermined speed and a running position when the motor exceed said predetermined speed, said switch means comprising one switch blade and two stationary contacts to form a single pole double throw arrangement, with provision for the switch blade to engage one of said contacts before disengaging the other said contact, means including the starting position of said switch means connecting an A.C. source of energy to selected ones of said junctions so that two of said four winding portions are positioned in space quadrature to the other two of said four winding portions, one of said two of said four winding portions connected across the said A.C. source acting as a partial main winding, and one of the said other two of said four winding portions connected serially with a phase shifting impedance device and across the said A.C. source acting as a partial starting winding, means including the running position of said switch means connecting the said four winding portions in a series parallel arrangement across said A.C. source at two of said junctions and connecting the said phase shifting impedance device across the other two of said junctions.

8. The motor defined in claim 7 wherein the said speed responsive switch blade disengages with one of said contacts before engaging the other of said contacts, and said switch means having an inoperative position.

9. The motor defined in claim 7 wherein the said phase shifting impedance device include a capacitor element shunted by a relatively low resistance element.

10. A partial winding start, full winding run, single phase A.C. motor comprising a stator having a stator winding thereon and a rotor having a rotor winding thereon, one of said windings having four separate symmetrically positioned winding portions each of said four winding portions including at least one pole winding group and all of said four winding portions permanently connected in series to form a closed loop circuit having four junctions positioned therebetween, speed responsive switch means movable between a starting position when the motor is operated below a predetermined speed and a running position when the motor exceeds said predetermined speed, said switch means comprising one switch blade and one contact, means including the starting position of said switch means connecting an A.C. source of energy to selected ones of said junctions so that two of said four winding portions are positioned in space quadrature and connected to be in magnetic quadrature to the other two of said four winding portions, one of said two of said four winding portions acting as a partial main winding connected across said A.C. source and the other one short circuited by said switch means, one of the said other two of said four winding portions acting as a partial starting winding connected serially with capacitor means shunted by resistor means and across said A.C. source, the running position of said switch means disconnecting said short circuit and means including the running position of said switch means connecting all of said four winding portions in a series parallel arrangement and across said A.C. source at selected two of said four junctions and connecting said capacitor and resistor means across the other two of said junctions.

11. A partial winding start, a full winding run, single phase A.C. motor comprising a stator having a stator winding thereon and a rotor having a rotor winding thereon, one of said windings having four separate symmetrically positioned winding portions each of said four winding portions including at least one pole winding group and all of said four winding portions permanently connected in series to form a closed loop circuit having four junctions positioned therebetween, speed responsive switch means movable between a starting position when the motor is operated below a predetermined speed and a running position when the motor exceeds said predetermined speed, said switch means comprising one switch blade and one contact, means including the starting position of said switch means connecting an A.C. source of energy to selected ones of said junctions so that two of said four winding portions are positioned in space quadrature to the other two of said four winding portions, one of said two of said four winding portions acting as a partial main winding connected serially with a reactor element and across said A.C. source, and the other one connected across said reactor in parallel therewith by said switch means, one of said other two of said four winding portions acting as a partial starting winding connected serially with a capacitor means shunted by a resistor means and across said A.C. source, the running position of said switch means disconnecting said reactor from said parallel connection, means including the running position of said switch means connecting all of the said four winding portions in a series parallel arrangement and across said A.C. source at selected two of said four junctions and connecting said reactor element serially with the said capacitor and shunting resistor combination and across the other two of said four junctions, deactivating said reactor, capacitor and resistor by means other than by switch means directly connected thereto.

12. A partial winding start, full winding run, single phase A.C. motor comprising a stator having a stator winding thereon and a rotor having a rotor winding thereon, one of said windings having two sets of four separate symmetrically positioned winding portions, said two sets to be mutually inductively coupled, each of said four portions of both of said sets including at least one pole winding group and all of the said four portions of each set to be permanently connected in series to form two separate closed loop circuits each having four junctions positioned between each of the said four winding portions of each set, speed responsive switch means movable between a starting position when the motor is operated below a predetermined speed and a running position when the motor exceeds said predetermined speed, said switch means comprising a switch blade and one contact, means including the starting position of said switch means connecting an A.C. source of energy to selected ones of said junctions of a first closed loop circuit so that two of the said four winding portions are positioned in space quadrature to the other two of said four winding portions and connected so that one of the said two of the said four winding portions acting as a partial main winding is connected across said A.C. source and the other one is short circuited by said switch means, one of the said other two of said four winding portions acting as a partial starting winding is connected serially with a capacitor means shunted by a resistor means, and across said A.C. source, a second closed loop circuit is connected to said first closed loop circuit at selected two junctions, the running position of said switch means disconnecting said short circuited winding, and means including the running position of said switch means connecting all of the said winding portions in a series parallel arrangement across said A.C. source to provide a full running winding, with said capacitor and shunting resistor means connected across selected ones of said junctions to deactivate said means.

13. The motor defined in claim 12 wherein the other two junctions of the said second closed loop circuit that are not connected to the said first closed loop circuit be connected by means, said connected means to provide a phase shift to a part of the said quadrature spaced windings of the said second closed loop circuit, in part by transformer action, and in part at least by leakage reactance between said mutually inductively coupled windings.

14. The motor defined in claim 12 wherein said second closed loop circuit be provided with a separate phase shifting means.

15. A partial winding, start, full winding run, single phase A.C. motor comprising a stator having a stator winding thereon and a rotor having a rotor winding thereon, one of said windings having at least one set of four separate symmetrically positioned winding portions, all of said four portions to be permanently connected in series to form at least one closed loop circuit having four junctions positioned therebetween, switch means movable between a starting position and a running position, means including the starting position of said switch means connecting an A.C. source of energy to selected ones of said junctions, and providing to at least one of said sets of four winding portions with at least one phase shifting means, said windings having a predetermined distribution factor, means including the running position of said switch means connecting all of the said winding portions in a series parallel arrangement and across said A.C. source to provide a full running winding, deactivating said phase shifting means and connecting the said windings to have a different distribution factor during the running position of said switch means than during the starting position of said switch means.

16. The motor defined in claim 15 wherein the said predetermined distribution factor of said windings be arranged to provide approximately the same flux density on the starting connection as on the running connection.

17. A partial winding start, full winding run, A.C. single phase motor comprising a stator having a stator winding thereon and a rotor having a rotor winding thereon, one of said windings having a main winding and a starting winding positioned in magnetic quadrature relative to said main winding, and means provided for changing the number of magnetic poles in the ratio of 1 to 2 wherein means are provided for directly energizing only a part of the said main winding and only a part of the said starting winding during starting at the lower number of poles and by means all of the windings are directly energized at the higher number of poles, under running conditions.

18. The motor defined in claim 17 wherein the said starting condition at the lower number of poles have a predetermined distribution factor for the said windings as determined by having a different number of conductors in some coils than others, and during the said running condition at the higher number of poles the distribution factor will be different than at the said lower number of poles as determined by the numerical sum of the conductors in each slot of a pole winding group.

19. The motor defined in claim 17 wherein, at the said lower number of poles the flux density does not exceed, by a ratio of 1.40 to 1, the flux density at the higher number of poles by arranging the said windings to have a more favorable winding distribution at the lower number of poles than at the higher number of poles.

20. The motor defined in claim 17 wherein, at the said lower number of poles the impedance of the windings does not exceed the impedance of the windings at the higher number of poles.

References Cited by the Examiner
UNITED STATES PATENTS

| 1,912,337 | 5/1933 | Kennedy | 318—224.1 X |
| 2,243,070 | 5/1941 | Cain | 318—221.5 |
| 2,646,538 | 7/1953 | Lewus | 318—221 |
| 2,808,554 | 10/1957 | Capps | 318—221 |
| 2,817,050 | 12/1957 | La Cour | 318—224.1 X |
| 2,823,342 | 2/1958 | Suhr | 318—221 |

ORIS L. RADER, *Primary Examiner.*